United States Patent
Lee

(10) Patent No.: US 10,298,966 B2
(45) Date of Patent: May 21, 2019

(54) VIDEO ON DEMAND SERVICE METHOD USING SOLID STATE DRIVE

(71) Applicants: LSD TECH CO., LTD., Seoul (KR); Ki Taik Lee, Seoul (KR)

(72) Inventor: Ki Taik Lee, Seoul (KR)

(73) Assignees: LSD TECH CO., LTD., Seoul (KR); Ki Taik Lee, Seoul (KR)

( * ) Notice: Subject to any disclaimer, the term of this patent is extended or adjusted under 35 U.S.C. 154(b) by 0 days.

(21) Appl. No.: 14/353,861

(22) PCT Filed: Oct. 19, 2012

(86) PCT No.: PCT/KR2012/008610
§ 371 (c)(1),
(2) Date: Apr. 24, 2014

(87) PCT Pub. No.: WO2013/062270
PCT Pub. Date: May 2, 2013

(65) Prior Publication Data
US 2014/0310758 A1    Oct. 16, 2014

(30) Foreign Application Priority Data
Oct. 24, 2011    (KR) ........................ 10-2011-0108552

(51) Int. Cl.
*H04N 21/24*    (2011.01)
*H04N 21/231*    (2011.01)
*H04N 21/232*    (2011.01)
*H04N 21/239*    (2011.01)
(Continued)

(52) U.S. Cl.
CPC ......... *H04N 21/231* (2013.01); *H04N 21/232* (2013.01); *H04N 21/2362* (2013.01);
(Continued)

(58) Field of Classification Search
USPC ....................................................... 709/250
See application file for complete search history.

(56) References Cited

U.S. PATENT DOCUMENTS 5,602,582 A * 2/1997 Wanderscheid ... H04N 7/17318
348/E7.071
7,639,882 B2 12/2009 Itakura
(Continued)

FOREIGN PATENT DOCUMENTS

JP    2003244676    8/2003

OTHER PUBLICATIONS

International Search Report—PCT/KR2012/008610 dated Feb. 26, 2013.
(Continued)

*Primary Examiner* — Umar Cheema
*Assistant Examiner* — John Fan
(74) *Attorney, Agent, or Firm* — Cantor Colburn LLP

(57) ABSTRACT

Disclosed is a VOD service method using an SSD which can greatly reduce an occupancy rate of a CPU by loading packets to be transmitted on a plurality of packet arrays and allocating CPU sessions in the unit of loaded packet groups, and accordingly enable a VOD service to be performed at a high speed. According to the VOD service method using the SSD, it is possible to greatly reduce the occupancy rate of the CPU by loading packets to be transmitted on the plurality of packet arrays and allocating CPU sessions in the unit of loaded packet groups, and thus to provide the VOD service at a high speed.

6 Claims, 4 Drawing Sheets

(51) Int. Cl.
   *H04N 21/434* (2011.01)
   *H04N 21/472* (2011.01)
   *H04N 21/643* (2011.01)
   *H04N 21/2362* (2011.01)
   *H04N 21/2662* (2011.01)

(52) U.S. Cl.
   CPC ..... *H04N 21/2393* (2013.01); *H04N 21/2405* (2013.01); *H04N 21/2662* (2013.01); *H04N 21/4343* (2013.01); *H04N 21/47202* (2013.01); *H04N 21/64322* (2013.01)

(56) References Cited

U.S. PATENT DOCUMENTS 8,645,437 B2 * 2/2014 Prasad .............. G06F 17/30132 707/823
2002/0157102 A1 10/2002 Lee et al.
2003/0154398 A1 * 8/2003 Eaton .................... G06Q 30/08 709/227
2004/0168204 A1 8/2004 Choe
2008/0155615 A1 * 6/2008 Craner ................... H04N 5/765 725/91
2009/0271832 A1 10/2009 Park et al.
2010/0199036 A1 * 8/2010 Siewert ................ G06F 3/0613 711/112
2010/0235542 A1 9/2010 Visharam et al.
2012/0084787 A1 * 4/2012 Jeong ................... G06F 9/4881 718/104

OTHER PUBLICATIONS

European Search Report—European Application No. 12843071.7 dated Apr. 28, 2015, citing US 2010/235542.

* cited by examiner

[Fig. 1]
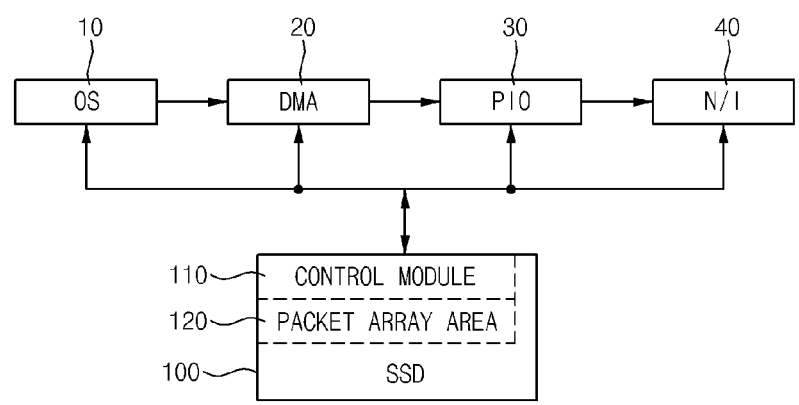

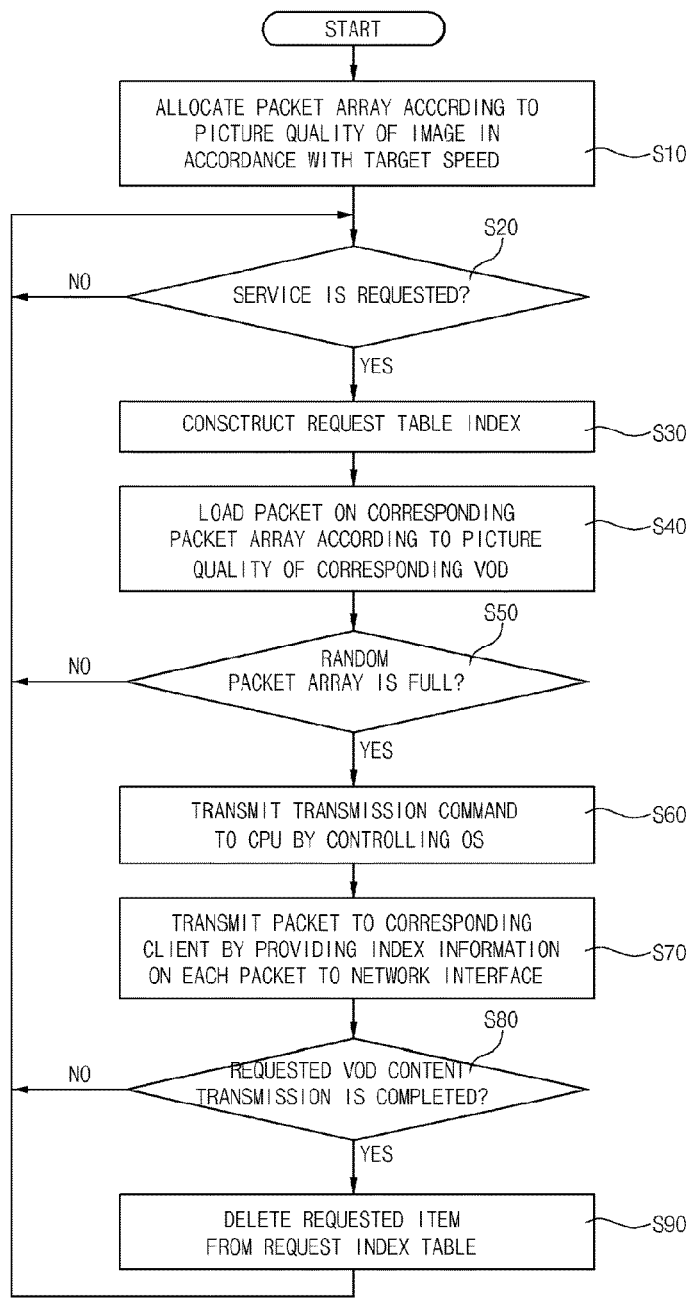

[Fig. 4]
| | Index NO. | PACKET ARRAY |
|---|---|---|
| 2Mbps | 1 | |
| | 3 | |
| | 4 | |
| | ⋮ | ⋮ |
| 4Mbps | 2 | |
| | 2 | |
| | 15 | |
| | 15 | |
| | ⋮ | ⋮ |
| 8Mbps | 7 | |
| | 7 | |
| | 7 | |
| | 7 | |
| | ⋮ | ⋮ |
[Fig. 5]
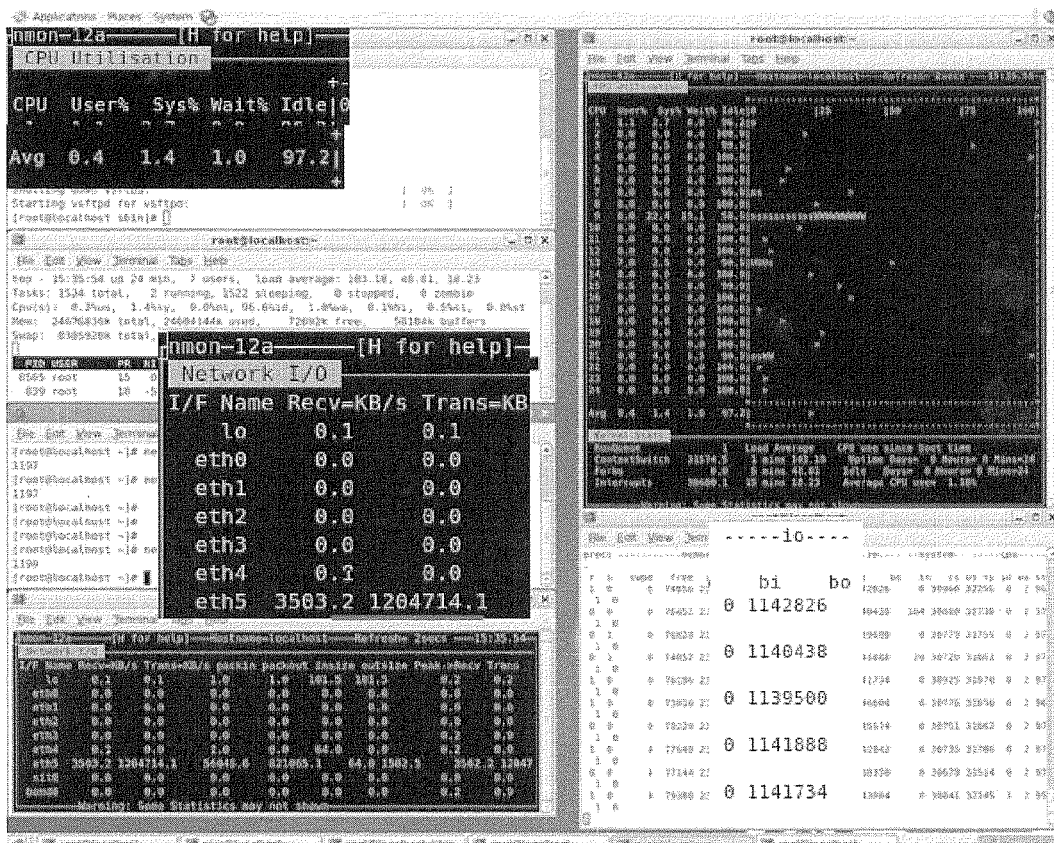

[Fig. 6]
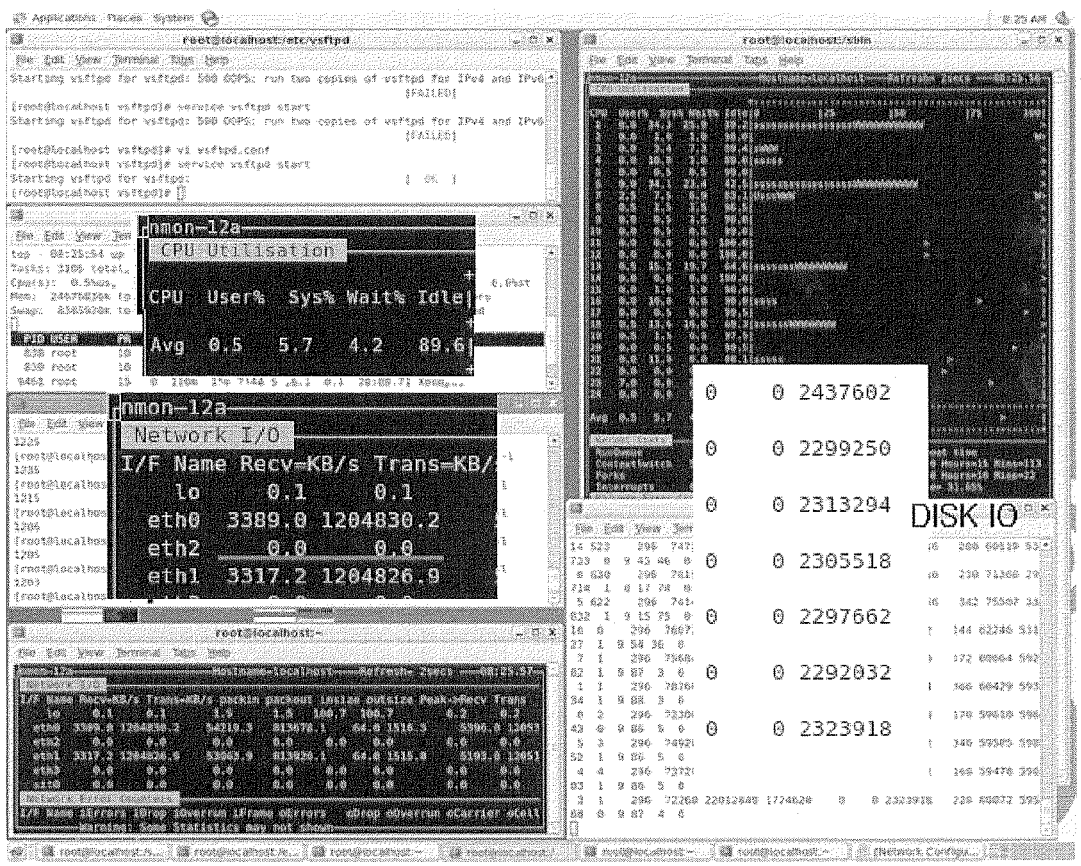

VIDEO ON DEMAND SERVICE METHOD USING SOLID STATE DRIVE

TECHNICAL FIELD

The present invention relates to a VOD service method using an SSD, and more particularly, to a VOD service method using an SSD, which can greatly reduce an occupancy rate of a CPU by loading packets to be transmitted on a plurality of packet arrays and allocating CPU sessions in the unit of loaded packet groups and thus enable a VOD service to be performed at a high speed.

BACKGROUND ART

With developments of a digital technology, an image compression processing technology, and high-speed computer communication and optical communication technologies, image information transmission in a broadband becomes possible, and thus a free bidirectional service has been already implemented on an Internet. Further, unlike a conventional Pay Per View (PPV) service where a subscriber demands a program and waits, a bidirectional image service where the subscriber immediately selects and views a desired program at a desired time, that is, a Video On Demand (VOD) service is provided. Particularly, due to activations of an IPTV and UCC, the VOD service has been actively used after the 2000's.

Meanwhile, a conventional VOD service adopts a Hard Disk Drive (HDD) for performing read/write in a mechanical manner as a storage device, so that a read/write speed is slow, and accordingly one HDD based server supports speeds only in a range substantially from 1 Gbps to 1.5 Gbps (giga bit per second).

In order to solve such HDD problems, a Solid State Drive (SSD) including a semiconductor memory such as a DRAM or NAND memory to purely electronically perform read/write has been proposed, and the SSD can perform the read/write at a greatly faster speed in comparison with the HDD since the SDD operates in an electronic manner. Accordingly, various attempts to provide the VOD service using the SSD as the storage device are currently made.

Meanwhile, substantially 1,500 bytes are transmitted per one packet on the network in the VOD service, and an operation system of the server manages the CPU to process one packet for each session, that is, to read one packet for each session from the storage device and transmit the read packet to a requester client through the network.

Accordingly, although a conventional VOD server adopts an SSD storage capable of sufficiently supporting a read/write speed equal to or faster than 10 Gbps, the CPU should process substantially 800,000 (10,000,000/1,500) commands per second to provide the 10 Gbps service, so that an occupancy rate of the CPU increases to more than 90% and thus the CPU cannot perform another task such as a system management or the like at all, which makes only a service at a maximum speed of 5 to 6 Gbps possible.

DISCLOSURE OF INVENTION

Technical Problem

The present invention has been made to solve the above mentioned problems, and an object of the present invention is to provide a VOD service method using an SSD, which can greatly reduce an occupancy rate of a CPU by loading packets to be transmitted to a plurality of packet arrays and allocating CPU sessions in the unit of loaded packet groups and thus enable a VOD service at a high speed.

Solution to Problem

In accordance with an aspect of the present invention, there is provided a VOD service method using an SSD, the VOD service method including: by a VOD server using the SSD, (a) allocating a packet array according to a target transmission speed; (b) constructing a request index table containing an IP address of a requester client, and a file name and a file storage address of a request content when there is a VOD request from a client; (c) reading a predetermined number of packets of the request content from the SSD, matching the packets with information for identifying the requester client in the request index table, and loading the matched packets on the packet array; and (d) simultaneously transmitting packets stored in the packet array for one session of a CPU with reference to the request index table when a storage space of the packet array is full.

In the above-described configuration, the packet array may be set to be a plurality of packet arrays for each picture quality level of an VOD content image.

The VOD service method may further include (e) deleting a corresponding request item from the request index table when transmission of a requested VOD content is completed.

In accordance with another aspect of the present invention, there is provided a computer-readable recording medium for storing a program executing the method as claimed in one of claims 1 to 3.

Advantageous Effects of Invention

According to a VOD service method using an SSD of the present invention, it is possible to greatly reduce an occupancy rate of a CPU by loading packets to be transmitted on a plurality of packet arrays and allocating CPU sessions in the unit of loaded packet groups, and accordingly to provide a VOD service at a high speed.

BRIEF DESCRIPTION OF DRAWINGS

FIG. 1 is an external functional block diagram of a VOD server implementing a VOD service method using an SSD of the present invention.

FIG. 2 is a flowchart for describing a VOD service method using an SSD of the present invention.

FIG. 3 is a diagram illustrating an example of a request index table constructed in a control module of an SSD according to the present invention.

FIG. 4 is a diagram illustratively showing a packet array arranged in a packet array area of an SSD according to the present invention.

FIGS. 5 and 6 are diagrams illustrating examples of an actual monitoring screen of a VOD service according to the present invention, respectively.

MODE FOR THE INVENTION

Hereinafter, exemplary embodiments of a VOD service method using an SSD according to the present invention will be described in detail with reference to the accompanying drawings.

The present invention has been made based on the fact that only an IP address of a requester client and a type (picture quality) of requested contents are different in VOD contents and a pattern of data is the same.

FIG. 1 is an external functional block diagram of a VOD server implementing a VOD service method using an SSD of the present invention. As illustrated in FIG. 1, a VOD server of the present invention is configured by an inter-working between a control module 110 for supporting the VOD service method of the present invention and an Operation System (OS) 10 of a server for operating a CPU, a Direct Memory Access (DMA) 20 for performing data read/write in an SSD 100, a Peripheral Input/Output (PIO) 30 such as a Peripheral Component Interconnect-Express (PCI-e) for connecting the CPU with a peripheral device, and a network interface 40 such as a TCP/IP Offload Engine (TOE) for providing a high-speed network input/output processing.

In the above-described configuration, the control module 110 may be formed by firmware installed within the SSD 100, and a request index table for requested contents which will be described below may be constructed in a temporary storage (TEMP) area managed by the control module 110. Meanwhile, a packet array area 120 which groups VOD packets to be transmitted in the unit of a predetermined number of packets, for example, in the unit of 1,000 packets and then temporarily stores the grouped VOD packets is included in the SSD 100.

FIG. 2 is a flowchart for describing the VOD service method using the SSD of the present invention, and the VOD service method is performed by the control module 110 of the present invention as a subject not otherwise specified. As illustrated in FIG. 2, the packet array according to a picture quality of an image, for example, a ultra HD level, a full HD level, a HD level, an SD level or the like is first allocated to the packet array area 120 of the SSD 100 in step S10, and the packet array may be properly determined by a server manager, for example, in synthetical consideration of a target transmission rate, a request ratio for each picture quality level, the number of simultaneous accessers and the like.

FIG. 4 is a diagram illustratively showing the packet array arranged in the packet array area 120 of the SSD 100 according to the present invention. As illustrated in FIG. 4, the packet array arranged in the packet array area 120 of the SSD 100 according to the present invention may be divided for each picture quality level of the image. When a relatively high ratio such as the full HD level or the ultra HD level is requested, many more storage areas may be allocated for the full HD level or the ultra HD level. Furthermore, the packet array may be constructed in such a manner that one packet is allocated to the packet array in the SD level (2 Mbps level) per one requester client, two packets are allocated to the packet array in the HD level (4 Mbps level), and four packets are allocated to the packet array in the full HD level (8 Mbps level).

The packet array for each picture quality level corresponds to information on the requester client to which a corresponding packet will be transmitted according to the loaded packet, for example, information on an index number of the request index table, an IP address of the requester client and the like.

Referring back to FIG. 2, it is determined whether there is a VOD service request from a random requester client in step S20. As a result of the determination of step S20, when there is the VOD service transmission request, step S30 is performed, which updates the request index table according to the corresponding VOD service request.

FIG. 3 is a diagram illustrating an example of the request index table constructed in the control module 110 of the SSD 100 according to the present invention. As illustrated in FIG. 3, the request index table according to the present invention may largely include an index number, an access IP address of the requester client, and identification information of the request contents, for example, a file name and a file storage address within the SSD 100 of the request contents.

Next, corresponding amounts of packets are read from the file storage address within the SSD 100 designated by the request index table according to a picture quality level of the corresponding VOD requested by the requester client and then loaded on the corresponding packet arrays, for example, one packet is loaded on an SD packet array in the SD level and two packets are loaded on an HD packet array in the HD level in step S40, and such a read operation may be performed by controlling the DMA 20.

Next, a random packet array determines whether the storage space is full in step S50, for example, in a case of the packet array of 1,000 packets, determines whether the 1,000 packets are all loaded. When not all the 1,000 packets are loaded, steps after step S20 are repeatedly performed. When all the 1,000 packets are loaded, a command for transmitting packets of the packet array fully packing into the CPU are transmitted at the same time by controlling the OS 10. Accordingly, the CPU sets one session and simultaneously transmits each packet loaded on the corresponding packet array to the network interface to instruct each requester client to transmit the packet. In this process, the transmission is performed after information on the requester client for the corresponding packet and an IP address of the requester client are identified with reference to the request index table. It may be known through FIG. 4 that the IP address of the corresponding requester client is identified by the index number of the request index.

As described above, according to the VOD service method of the present invention, it is possible to significantly reduce an occupancy rate of the CPU by allocating a plurality of packets to one CPU and then transmitting the allocated packets, and accordingly to increase a maximum transmission speed up to a maximum read/write speed allowed by the SSD 100. For example, in transmission of 800,000 packets, the CPU should set a total of 800,000 sessions in the prior art, but it is required to set only a total of 800 sessions according to the present invention, and thus the occupancy rate of the CPU is reduced and the transmission speed is greatly increased.

FIGS. 5 and 6 are diagrams illustrating examples of an actual monitoring screen of a VOD service according to the present invention, respectively. As shown in a right lower screen of FIG. 5, although the VOD server currently performs a VOD service at a transmission speed of 10 Gbps, an occupancy rate according to VOD contents transmission of the CPU is only 0.4% as shown in a left upper side. Further, although the remaining operations are performed, the occupancy rate is only 2.8% and 97.2% is in an idle state.

In FIG. 6, as shown in the right lower screen of FIG. 5, although the VOD server currently performs a VOD service at a transmission speed of 20 Gbps, an occupancy rate according to VOD contents transmission of the CPU is only 0.5% as shown in a left upper side. Further, although the remaining operations are performed, the occupancy rate is only 10.4%, and 89.6% is in an idle state.

Referring back to FIG. 2, it is determined whether transmission of the requested VOD contents is completed in step S80. When the transmission is not completed, steps after step S20 are repeatedly performed. When the transmission is completed, step S90 is performed, which deletes a corresponding request item from the request index table, and then the process returns to step S20.

The VOD service method using the SSD is not limited to the above described embodiments, but may be variously modified and then implemented without departing from the scope allowed by the technical idea of the present invention.

DESCRIPTION OF REFERENCE NUMERALS

10: OS, 20: DMA,
30: PIO, 40: N/I
100: SSD, 110: control module,
120: SSD

The invention claimed is:

1. A video on demand (VOD) service method using solid state drive (SSD), the VOD service method comprising:
by a VOD server using the SSD,
(a) setting a packet array area in the SSD where VOD packets to be transmitted are grouped in a unit of a predetermined number of packets and then temporarily stored, and allocating a plurality of packet arrays according to one of a plurality of picture quality levels of an image, the plurality of the picture quality levels comprising a standard definition level a high-definition level, a full high-definition level, and an ultra-high-definition level and further allocating a plurality of packet arrays according to a target transmission speed, a request ratio for each picture quality level, and the number of simultaneous requesters;
(b) constructing a request index table containing an internet protocol (IP) address of a requester client, and a file name and a file storage address of a requested content of a VOD when the VOD is requested by the requester client;
(c) reading packets of the requested content from the file storage address within the SSD designated by the request index table, and-loading the read packets on a corresponding one of the plurality of packet arrays according to a picture quality level of the VOD requested by the requester client, and repeating the reading and the loading until a random packet array determines that all read packets have been loaded:
(d) setting a single session of a central processing unit (CPU), and simultaneously transmitting the packets loaded on the corresponding packet array to a network interface connected to the requester client during the single session of the CPU by referring to the request index table when a storage space of the packet array is full,
wherein the step (d) is performed if the VOD is requested by the requester client, and is not performed if the VOD is not requested by the requester client; and
(e) deleting a corresponding request item from the request index table when transmission of the requested content of the VOD is completed, wherein the reading, the loading, and the transmitting of the packets reduces an occupancy rate of the CPU.

2. A non-transitory computer-readable recording medium for storing a program executing the method as claimed in claim 1.

3. A video on demand (VOD) server comprising: a central processing unit (CPU); and a solid state drive (SSD) including a control module and a packet array area, wherein the control module is configured to:
(a) group VOD packets to be transmitted in a unit of a predetermined number of packets, temporarily store the grouped VOD packets in the packet array area, and allocate a plurality of packet arrays according to one of a plurality of picture quality levels of an image, the plurality of the picture quality levels comprising a standard definition level a high-definition level a full high-definition level, and an ultra-high-definition level and further allocating a plurality of packet arrays according to a target transmission speed, a request ratio for each picture quality level and the number of simultaneous requesters;
(b) construct a request index table containing an IP address of a requester client, a file name and a file storage address of a requested content of a VOD when the VOD is requested by the requester client;
(c) read packets of the requested content from the file storage address within the SSD designated by the request index table, and-load the read packets on a corresponding one of the plurality of packet arrays according to a picture quality level of the VOD requested by the requester client, and repeating the reading and the loading until a random packet array determines that all read packets have been loaded;
(d) after a single session is set by the CPU, simultaneously transmit the packets loaded on the corresponding packet array to a network interface connected to the requester client during the single session of the CPU by referring to the request index table if a storage space of the packet array is full, wherein the step (d) is performed if the VOD is requested by the requester client, and is not performed if the VOD is not requested by the requester client; and
(e) delete a corresponding request item from the request index table when transmission of the requested content of the VOD is completed, wherein the reading, the loading, and the transmitting of the packets reduces an occupancy rate of the CPU.

4. The VOD service method of claim 1, wherein a packet array of the plurality of packet arrays corresponding to the standard definition level comprises one packet.

5. The VOD service method of claim 1, wherein a packet array of the plurality of packet arrays corresponding to the high-definition level comprises two packets.

6. The VOD service method of claim 1, wherein a packet array of the plurality of packet arrays corresponding to the full high-definition level comprises four packets.

* * * * *